Nov. 15, 1927.

H. E. ELROD 1,648,983

APPARATUS FOR PREPARING INFUSION BEVERAGES

Filed Aug. 28, 1925    2 Sheets-Sheet 1

Inventor
Henry E. Elrod
By Knight Bros
Attorneys

Nov. 15, 1927.  1,648,983
H. E. ELROD
APPARATUS FOR PREPARING INFUSION BEVERAGES
Filed Aug. 28, 1925    2 Sheets-Sheet 2
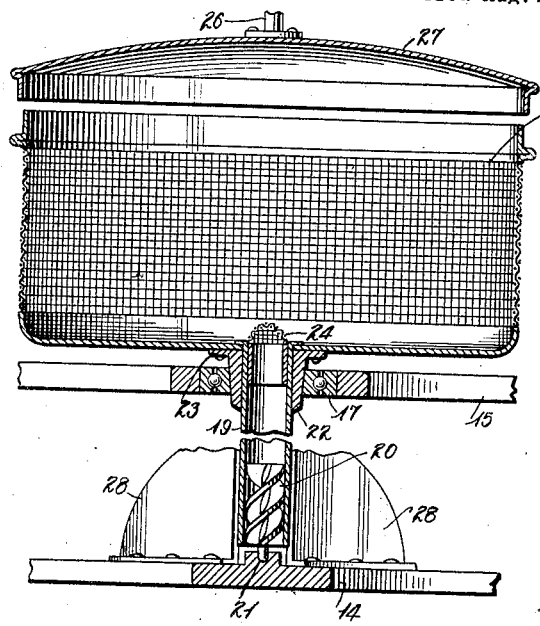
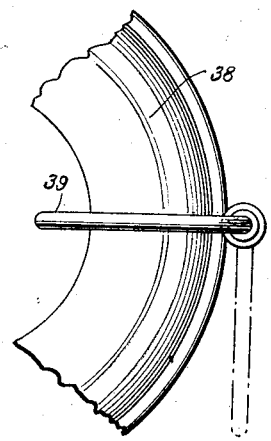
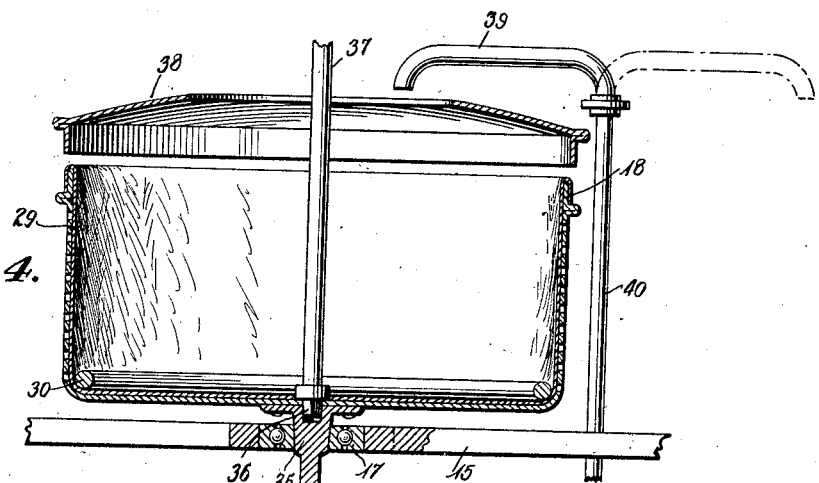
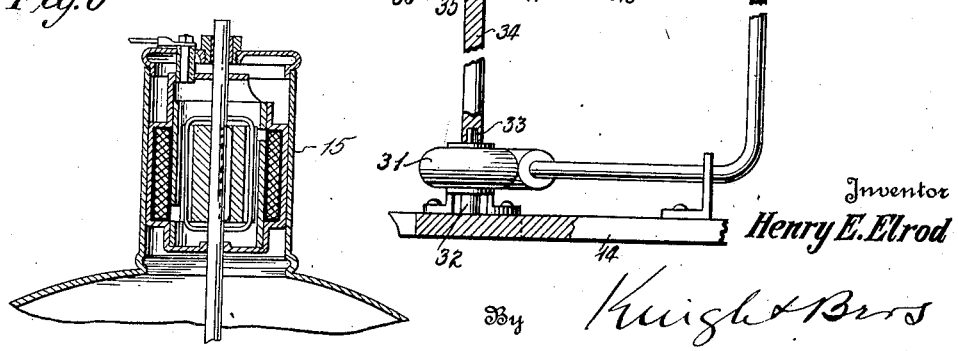
Inventor
Henry E. Elrod
By Knight Bros
Attorneys Patented Nov. 15, 1927.

1,648,983

UNITED STATES PATENT OFFICE.

HENRY E. ELROD, OF TULARE, CALIFORNIA.

APPARATUS FOR PREPARING INFUSION BEVERAGES.

Application filed August 28, 1925. Serial No. 53,153.

My invention relates to novel mechanism for quickly and efficiently leaching out the essential elements of ground coffee and the like. Briefly, I accomplish these desirable results by the application of centrifugal force, the grounds or the like being placed in a centrifuge disposed preferably above the maximum liquid level in a coffee urn, liquid being continually raised from the urn and delivered to the centrifuge.

Figure 1:
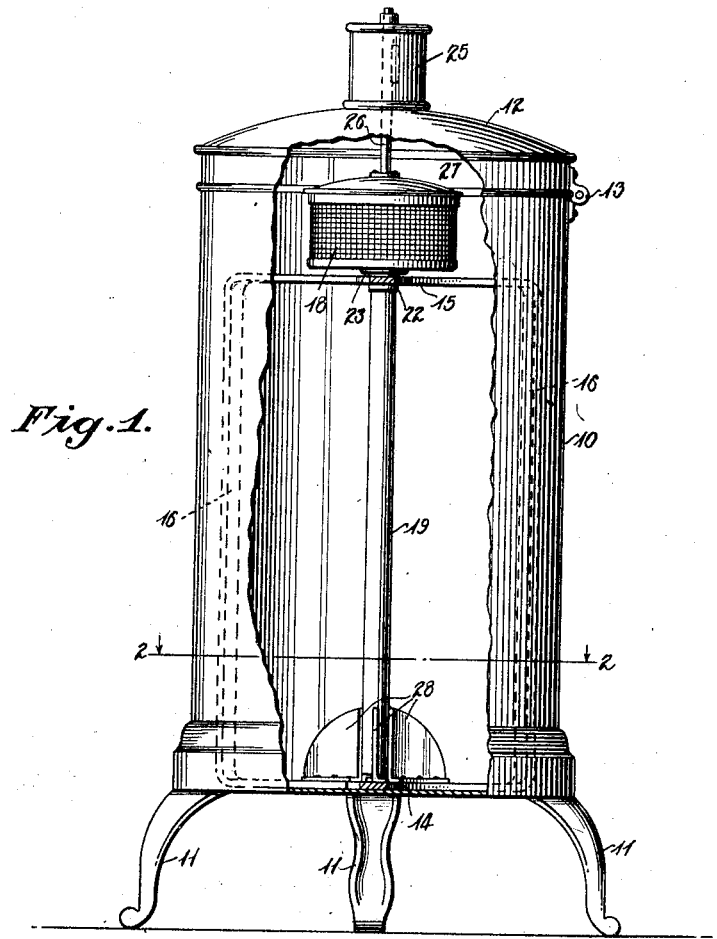
Figure 2:
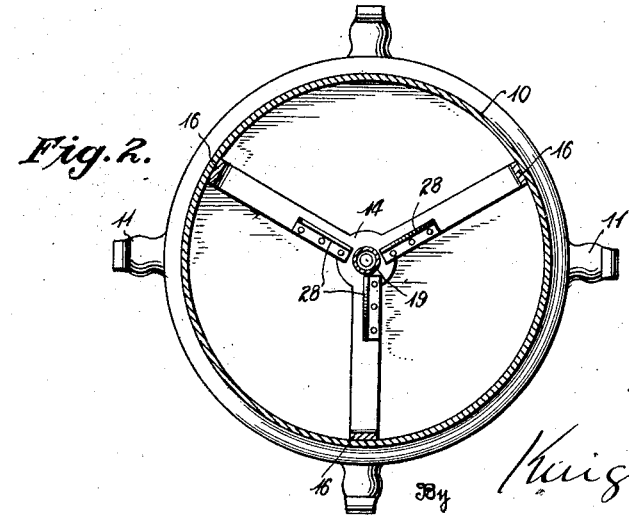

A practical embodiment of the invention will be described with reference to the accompanying drawings, in which Fig. 1 is a side view of a coffee urn equipped with my invention, part of the side wall of the urn being broken away for purposes of illustration, Fig. 2 is a section on the line 2—2 of Fig. 1, Fig. 3 is an enlarged view of certain elements shown in Fig. 1, Fig. 4 shows modifications of the structure according to Fig. 3, and Fig. 5 is a top plan view of a portion of Fig. 4.

Fig. 6 is a vertical section through the driving motor.

The novel apparatus to be described can be readily applied to coffee urns or the like of usual structure and in Figs. 1 and 2, 10 represents an urn of usual design comprising a vertical cylindrical portion supported on legs 11 and provided with a cover 12 hinged thereto at 13. A frame work consisting of two horizontal spiders 14 and 15 and vertical connecting pieces 16 is disposed within the urn, its dimensions being such that the elements 16 will all be in contact with the side walls of the container or urn. Enough friction is developed between the elements 16 and the side walls to prevent rotation of the frame about its vertical axis, and yet not to prevent the ready removal or insertion of the frame. The upper spider 15 is provided with a central vertical bore in which is inserted and held a ball bearing assembly 17, Figs. 3 and 4. The inner annulus of the assembly 17 is provided with a conical bore as shown. The centrifuge 18 is provided with perforated or foraminous side walls and with a central aperture in its bottom wall, Figs. 1 to 3. A vertical pipe 19 is rigidly fixed in communication with this aperture and extends nearly to the bottom of the urn. In the lower end of the tube 19 is fixed a screw 20 having an axial stud 21 journaled in a step bearing in the lower spider 14. The upper end of the tube 19 is encircled by a collar 22 having a horizontal flange 23 attached to the bottom wall of the centrifuge. The collar 22 is of conical shape and mates with the conical inner periphery of the inner annulus of the ball bearing assembly. A strainer 24 is insertable in the upper end of the tube 19. A motor 25 is fixed on the cover 12 of the urn, the motor shaft 26 being splined in the armature so as to be slidable in a vertical direction. The cover 27 of the centrifuge is fixed to the lower end of shaft 26. The cover 27 fits tightly on the centrifuge and it is evident that upon the operation of the motor the centrifuge and therewith the screw 20 will be driven so that liquid in the lower portion of the urn will be delivered to the center of the centrifuge and will be discharged from the latter by centrifugal force, leaching the coffee grounds or the like which are contained in the centrifuge. The screw 20 need consist of but two or three turns since at ordinary motor speed this will be sufficient to elevate the liquid efficiently. In order to prevent a swirling of the liquid at the bottom of the container, baffles 28 may be fixed on spider 14.

As shown in Fig. 3 in particular, the side walls of the centrifuge are composed of fine wire mesh and with this structure the usual cloth bag may be omitted. In Fig. 4 the walls of the centrifuge are shown as being perforated and provided with an inner liner 29 held in place by the ring 30 and by the clamping action of the cover of the centrifuge. This liner 29 may be of cloth although filter paper may be used as being less apt to impair the flavor of the beverage. On the other hand, the liner 29 may be made of porous tile or stone such, for instance, as is known in the trade as "Filtros."

According to Fig. 4 a centrifugal pump 31 replaces the screw as described in connection with Fig. 3. The pump 31 having the intake 32 is fixed on the lower spider 14 its rotor being provided with a squared stud 33. The ball bearing assembly 17 is substantially the same as described in connection with Fig. 3 although the pipe 19 is replaced by a solid shaft 34 fixed to the bottom of the centrifuge and having a conical enlargement 35 engaging in the inner annulus 17. The shaft 34 has a recess mating with stud 33. This shaft 34 is also recessed at its upper end which recess mates with the squared end 36 of motor shaft 37. In order that the stud 36 may engage in the upper recess of shaft 34, the centrifuge is provided with a central aperture in its bottom wall. Shaft 37 is splined in the armature of its associated motor as described in connection with Fig. 1. In this modification the cover 38 of the centrifuge is centrally perforated to permit the entrance of liquid into the centrifuge from spout 39. This spout is horizontally swingable in order to allow the centrifuge to be readily removed and is in connection with pump 31 by means of conduit 40.

It is believed that the assembly and operation of the invention will be obvious from the above description. It is to be understood that I do not limit myself to the specific structure described and various modifications coming within the purviews of the following claims will suggest themselves to those skilled in the art.

I claim:

1. In combination with an urn for making infusion beverages, a centrifuge in the urn above the liquid level, a removable cover for the centrifuge, a motor above said centrifuge, said cover being attached to the armature of said motor, whereby, said cover being in operative position, rotation may be transmitted to the centrifuge from the motor, and means for delivering liquid in the urn to the centrifuge.

2. In combination with a coffee urn or the like, a mechanical infusion device, and a frame for supporting said device in the urn, said frame comprising upper and lower spiders, and upright members connecting the spiders, said frame and therewith said infusion device being removable from the urn.

3. An apparatus for making infusion beverages comprising an urn, a centrifuge in said urn, a removable cover on said centrifuge, a removable cover on said urn, a motor mounted on said urn cover, and a shaft rigid with said centrifuge cover, and having a spline connection with the armature of said motor, whereby the covers may be separately removed, and the centrifuge may be driven by the motor when the covers are placed in position.

4. In an apparatus for making infusion beverages, an urn whose interior walls and bottom are entirely free from recesses and protrusions, a removable frame in said urn supported by engagement with the walls and bottom of the urn, a centrifuge, a supporting member for said centrifuge, mounted for rotation upon said removable frame and means for rotating said centrifuge.

The foregoing specification signed at Tulare, California, this eighteenth day of July, 1925.

HENRY E. ELROD.